(12) United States Patent
Wolf et al.

(10) Patent No.: US 8,028,542 B2
(45) Date of Patent: Oct. 4, 2011

(54) SYSTEM FOR MAKING GLASS ARTICLES

(75) Inventors: Ferdinand Wolf, Hagen (DE); Rainer Hensel, Iserlohn (DE)

(73) Assignee: Putsch GmbH & Co KG, Hagen (DE)

( * ) Notice: Subject to any disclaimer, the term of this patent is extended or adjusted under 35 U.S.C. 154(b) by 565 days.

(21) Appl. No.: 11/894,589

(22) Filed: Aug. 21, 2007

(65) Prior Publication Data

US 2008/0047302 A1    Feb. 28, 2008

(30) Foreign Application Priority Data

Aug. 21, 2006   (DE) .......................... 10 2006 039 175

(51) Int. Cl.
*C03B 7/10* (2006.01)
*C03B 7/11* (2006.01)

(52) U.S. Cl. ................................. 65/123; 65/133; 65/334

(58) Field of Classification Search .................... 65/127, 65/133, 334, 70, 105, 123, 433; 83/600

See application file for complete search history.

(56) References Cited

U.S. PATENT DOCUMENTS

| | | | |
|---|---|---|---|
| 5,049,179 A * | 9/1991 | Shinpo et al. | 65/332 |
| 6,289,696 B1 | 9/2001 | Bogert | |
| 2006/0230891 A1* | 10/2006 | Kawachi | 83/13 |

FOREIGN PATENT DOCUMENTS

EP        0 712 812        5/1996

* cited by examiner

*Primary Examiner* — Matthew Daniels
*Assistant Examiner* — Cynthia Szewczyk
(74) *Attorney, Agent, or Firm* — Andrew Wilford

(57) ABSTRACT

Glass articles are made by continuously emitting a plurality of strands of molten glass spaced different distances from respective preform molds, cutting through each of the strands by moving together a respective pair of blades to form a respective gob, and transporting the gobs through the respective distances to the preform molds. The pairs of blades are operated, that is moved from an open to a closed position, such that they cut through the respective strands one after the other with the first formed gob traveling through the longest distance to the respective preform mold and the last formed gob traveling through the shortest distance to the respective preform mold.

11 Claims, 5 Drawing Sheets

SYSTEM FOR MAKING GLASS ARTICLES

FIELD OF THE INVENTION

The present invention relates to a method of and apparatus for making glass articles. More particularly this invention concerns the separation of a plurality of glass gobs or slugs from respective molten-glass strands and feeding of the gobs to respective preform molds.

BRIEF DESCRIPTION OF THE DRAWING

In the following.

BACKGROUND OF THE INVENTION

In the manufacture of glass articles it is standard to feed molten glass to a plurality of nozzles that continuously emit respective strands of molten glass. Cutters sever gobs (also referred to as slugs) from the emerging strand and these gobs are then fed to respective preform holders where they are conditioned, that is heated or cooled to a predetermined temperature, before being actually molded or otherwise transformed into the desired finished shape.

The cutting device has a plurality of pairs of cutting blades whose cutting edges are movable from a starting position, in which the glass strand flows between the respective cutting blades, into a working position in which each glass strand is severed with the formation of a gob, and back into the starting position. The gobs are deposited into a preform having multiple adjacently spaced blank molds where the separated gobs are optionally shaped into blanks. A shaping device can receive the blanks from the preform and processing them into glass articles. The travel paths through which the gobs move from the severing and separation stage to the preform molds have different lengths.

Normally the strands are extruded vertically downward, that is in the vertical direction, and the cutter blades are movable horizontally, that is in the horizontal direction. The travel paths through which the freshly formed gobs path can extend in both the X and vertical directions, and are invariably of different lengths.

U.S. Pat. No. 6,289,696 of Bogert describes a device where a pair of arms pivotal about respective vertical axes each carry a plurality of blades. The arms can be pivoted together, scissor-like, to substantially simultaneously sever a respective gob from a strand oriented between a pair of blades. The blades of each arm are fixed relative to each other and, hence, move synchronously. Thus the gobs are formed substantially simultaneously and therefore, on their way to the respective preform molds, travel different distances and, as a result, cool differently by the time they reach the preform mold.

EO 0,712,812 of Giraudo has a system where the cutting blades of a cutting blade pair may be moved linearly and horizontally. Here as well, multiple glass strands flow vertically in the vertical direction between the open cutting blade pair, and are severed by the horizontal linear movement of the cutting blades. Each of the left and right cutting blades is mounted on a separate carrier. Each carrier may be actuated by means of a linear electric motor, thus enabling all the cutting blades to move together into the separating position and into the starting position.

Figure 2:
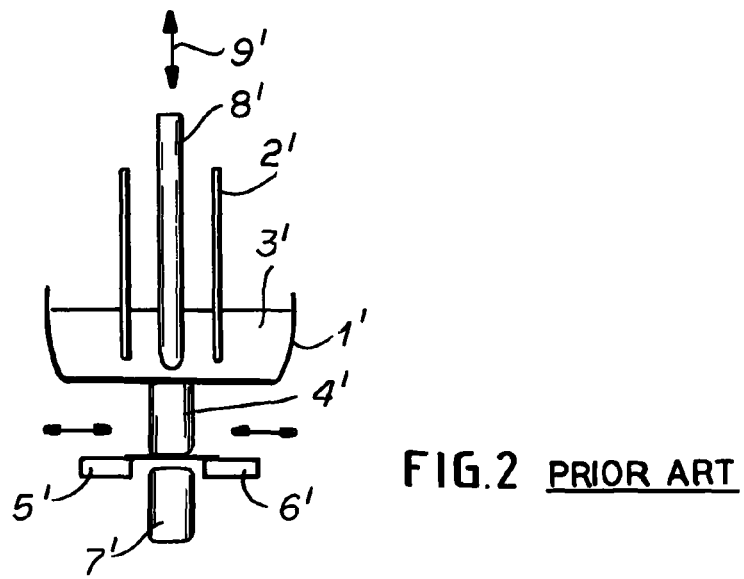
FIG. 2 is a view of a portion of a prior-art system.

In both of these known devices, when the cutting blades are moved into the closed position the glass strand accumulates atop the cutting blades and is compressed. This disturbs the droplet fall, causing the gobs separated from the glass strand to be deformed. This effect is disadvantageous for the subsequent processing of the gob. For this reason it is known to provide an auxiliary device as shown in FIG. 2 having a supply 1' into which molten glass flows via a rotary tube 2'. The level of the glass melt is indicated by reference numeral 3'. A strand 4' of molten glass flows downward in direction Z from the supply 1'. The glass strand 4' is severed by means of a pair of cutting blades 5' and 6', and a gob 7' is separated and delivered to an unillustrated preform. To prevent the glass strand 4' from accumulating on the cutting blades 5' and 6' during the separation procedure for the gob 7', a plunger 8' is provided which may be moved in the direction of the arrow 9'. During the cutting operation this plunger 8' is moved back, i.e., moved upward in the direction of the arrow 9', in order to move the glass strand 4' back during the cutting operation, thus preventing the glass strand from accumulating on the cutting blades 5', 6' and being deformed. Such a system is complicated. For a high cutting frequency of the cutting blade pairs it is less efficient. The cutting frequency may be 200 cuts per minute, for example.

Figure 5:
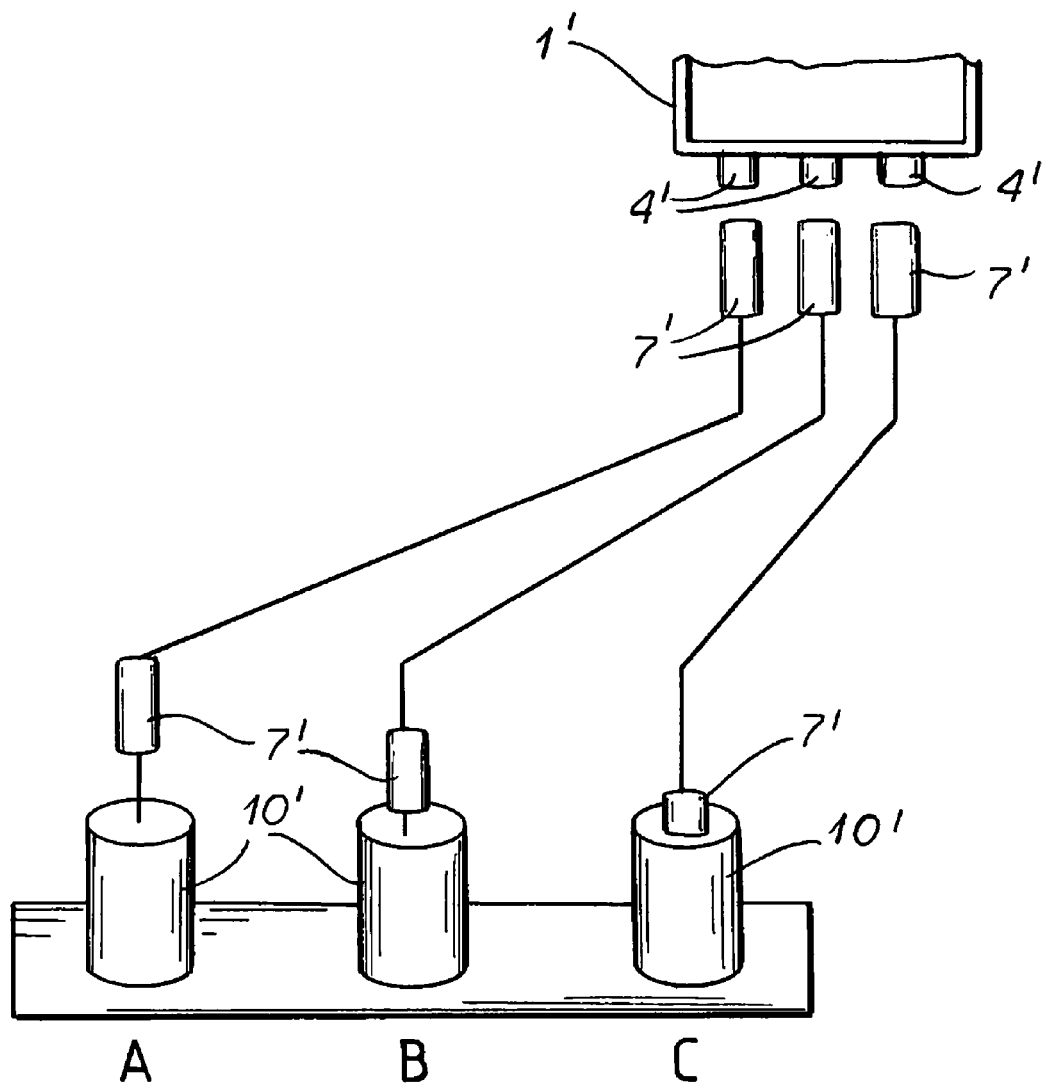
FIG. 5 is a schematic perspective view the prior-art system.

Another disadvantageous effect occurs when multiple gobs 7' from a plurality of glass strands 4' are simultaneously separated and are delivered to adjacently positioned preforms 10'. This procedure is illustrated in FIG. 5. The gob 7' on the right is the first to arrive at the preform 10' at station C, and due to the different distances from the cut point to the preform 10' the second gob 7' requires a longer time to arrive at the preform 10' at station B. Finally, the left gob 7' in FIG. 5 requires the longest time to arrive at the preform 10' at station A. As a result, the gob 7' in preform station C has a longer residence time than the gob 7' for preform station A. The preforming work step cannot begin until all gobs 7' have arrived at the corresponding preforms 10'. Due to the longer residence time, the gob 7' for preform 10' in station C is situated lower on the muzzle tool for preform station C, which also results in greater heating in the region of preform 10' of station C. On the other hand, the temperature of the gob 7' in preform 10' at station C is less than in the region of preform 10' at station A. This means that problematic differing cooling adjustments must be taken into account.

OBJECTS OF THE INVENTION

It is therefore an object of the present invention to provide an improved system for making glass articles.

Another object is the provision of such an improved system for making glass articles that overcomes the above-given disadvantages, in particular that ensures that, even though the gobs must travel through different distances from the respective cutters to the respective preform molds, they will all arrive a the same time.

A further object is to provide an improved method of severing gobs from preforms that is simple and that employs a simple cutting system.

SUMMARY OF THE INVENTION

Glass articles are made according to the invention by continuously emitting a plurality of strands of molten glass spaced different distances from respective preform molds, cutting through each of the strands by moving together a respective pair of blades to form a respective gob, and transporting the gobs through the respective distances to the preform molds. According to the invention the pairs of blades are operated, that is moved from an open to a closed position, such that they cut through the respective strands one after the other with the first formed gob traveling through the longest distance to the respective preform mold and the last formed gob traveling through the shortest distance to the respective preform mold.

In other words each cutting blade of each blade pair has its own actuator for moving the cutting blade from the open position into the closed position and back into the open position. A controller operates the cutting blade actuators so that the respective cutting blades move at different times. The cutting blade pair for the separated gob that travels the longest distance to the preform is actuated first, and the cutting blade pair for the separated gob that travels the shortest distance to the preform is actuated last, so that all separated gobs are deposited in the associated preform at approximately the same time. The glass gobs are thus separated from the respective glass strands at different times, corresponding to the different distances, so that the gobs arrive at the preforms and are deposited therein essentially at the same time.

By providing each cutting blade of each cutting blade pair with a separate actuator for moving the cutting blade from the open position into the closed position and back into the open position, in combination with the corresponding control of the actuators the possibility is afforded that gobs composed of a plurality of glass strands may be separated from the respective glass strands in a time sequence such that, depending on the time, i.e. the distance, required for each individual gob to arrive at the preform, the operation is coordinated in such a way that all gobs arrive at the associated preforms at the same time. In this manner all the gobs separated from the glass strands are conditioned equally. As a result, the glass product to be shaped from the gob is manufactured with a higher uniform quality.

One particular advantage resulting from the individual actuation of the single cutting blades of each cutting blade pair is that, regardless of whether one cutting blade or the other is moved in advance of the other respective cutting blade of a cutting blade pair, the cutting center may be shifted in the direction transverse to the glass strand flowing through. Deviations in the discharged glass strand from the vertical target position may be compensated for by shifting the cutting center, always ensuring a clean cut ending at the same time.

In one preferred embodiment of the device, the time required by each gob from separation until deposition in the preform is stored as a constant in the control device, and the control device activates the actuators for the cutting blade pairs with a corresponding time delay.

The invention further relates to a device in which the glass strands flow from the feed apparatus in the direction of gravity, i.e. vertically downward, and the movement of the cutting blades of the cutting blade pairs occurs in the horizontal direction, essentially at right angles to the vertical direction.

To ensure that glass gobs of the greatest uniformity possible are separated from the glass strands, and which are precisely defined with respect to the length, diameter, and temperature, and in addition a high cutting frequency with stable downward movement is achieved, the invention with respect to the device provides that the movement of the cutting blades in the horizontal direction is superimposed on movement in the vertical direction, so that the cutting blades are moved with respect to a glass strand synchronously and in the same direction into an end position and back into the open position, at least over the distance or the time in which the cutting blades sever the glass strand for forming a gob.

This is achieved with respect to the method by superimposing the movement of the cutting blades in the horizontal direction by a movement in the vertical direction, so that the cutting blades are moved with respect to the discharged glass strand synchronously and in the same direction, at least during the separation procedure for the glass strand, and after the gob is separated the cutting blades are moved in the opposite horizontal direction from the closed position into the open position, and at the same time are moved in the opposite vertical direction from the lower end position into the upper starting position.

As a result of this design and process engineering, the cutting of the gobs occurs synchronously with the flow rate of the glass strand. In this manner high reproducibility of the cutting result and high repeat accuracy are achieved during separation of the gob, and in addition an extremely high cutting frequency with stable droplet fall may be realized. The shape of the separated glass gobs is consistent, and their temperature is likewise uniform.

This invention is based on the concept that deformation of the gob may be avoided when the cutting procedure, i.e. the movement of the cutting blades in the horizontal direction, is combined with a superimposed movement of the cutting blades in the vertical direction, resulting in synchronous operation between the cutting blades and the discharged glass strand in the vertical direction, at least during the cutting procedure. After the glass strand is severed and the gobs are isolated, the cutting blades may be pulled back in the horizontal direction and moved in the upward to the starting position, so that the cutting blades are available for the next separation procedure.

In one embodiment of the device, each cutting blade of a cutting blade pair is connected to a first actuator by means of which the cutting blade may be moved in the horizontal direction, and is also connected to a second actuator by means of which the first actuator together with the cutting blade may be moved in the vertical direction.

It is also preferred that each cutting blade of a cutting blade pair is moved, or the actuators are controlled, in such a way that at the start of a separation cycle first the movement in the vertical direction or start-up of the second actuator occurs, and only then does the subsequent movement in the horizontal direction or start-up of the first actuator occur, and after the cutting is performed the cutting blades may be moved in the horizontal direction back into the open position, and moved in the vertical direction back to the upper starting position.

This ensures that the cutting blades are initially moved in the same direction and at the same speed as the discharged glass strand before the cutting blades are moved in the horizontal direction for separation of the gob. This design is important for uniform shaping of the gob. The first actuator and the second actuator may each be designed as linear actuators.

To simplify the design of the device it is further provided that the respective first cutting blades of each cutting blade pair together with the actuator or actuators that are movable in the horizontal direction are mounted on a first frame part, the respective second cutting blades of each cutting blade pair together with the actuator or actuators which are movable in the horizontal direction are mounted on a second frame part, and both the first and second frame parts are connected to a lifting plate which may be moved in the vertical direction by the single second actuator supported in a fixed manner on the frame.

One advantageous embodiment of the method is characterized in that each cutting blade pair is actuated separately, the actuators being controlled as a function of the time required for each post after separation to be deposited in the preform in such a way that all gobs are deposited in the preform at the same time.

In addition, the movement of the cutting blades in the horizontal direction may be superimposed on movement in the vertical direction, so that the cutting blades are moved with respect to the discharged glass strand synchronously and in the same direction, at least during the separation procedure of the glass strand for producing the gob, and after the gob is separated the cutting blades are moved in the opposite horizontal direction from the closed position into the open position, and at the same time are moved in the opposite vertical direction from the end position back into the upper starting position.

By use of this procedure it is possible to separate gobs having uniform shape and quality, while also achieving a high cutting frequency with stable droplet fall. The devices and methods in customary use heretofore which operate with a plunger inevitably result in a discontinuous delivery of the glass strand from the supply.

According to the invention, the glass strand is continuously delivered from the supply at a constant speed. This is possible in that the cutting blades are moved synchronously with the discharged glass strand during the cutting operation, thus preventing the glass strand from being deformed by accumulation on the cutting blades.

In another preferred procedure, at the start of a separation cycle the cutting blades are first moved from the upper starting position in the vertical direction and moved synchronously with the strand, and only then are the cutting blades moved in a superimposed manner in the horizontal direction from the open position into the closed position, until the cutting for producing the gob is performed, and then the cutting blades are moved in the opposite horizontal direction from the closed position in the direction of the open position, and are subsequently moved in the opposite vertical direction from the lower end position back into the upper starting position.

Furthermore, the movement of the cutting blades of each cutting blade pair occurs synchronously in both the horizontal direction and the vertical direction.

It is also preferred that each cutting blade is moved separately in the horizontal direction.

It is further preferred that all cutting blades are moved together in the vertical direction.

SPECIFIC DESCRIPTION

Figure 1:
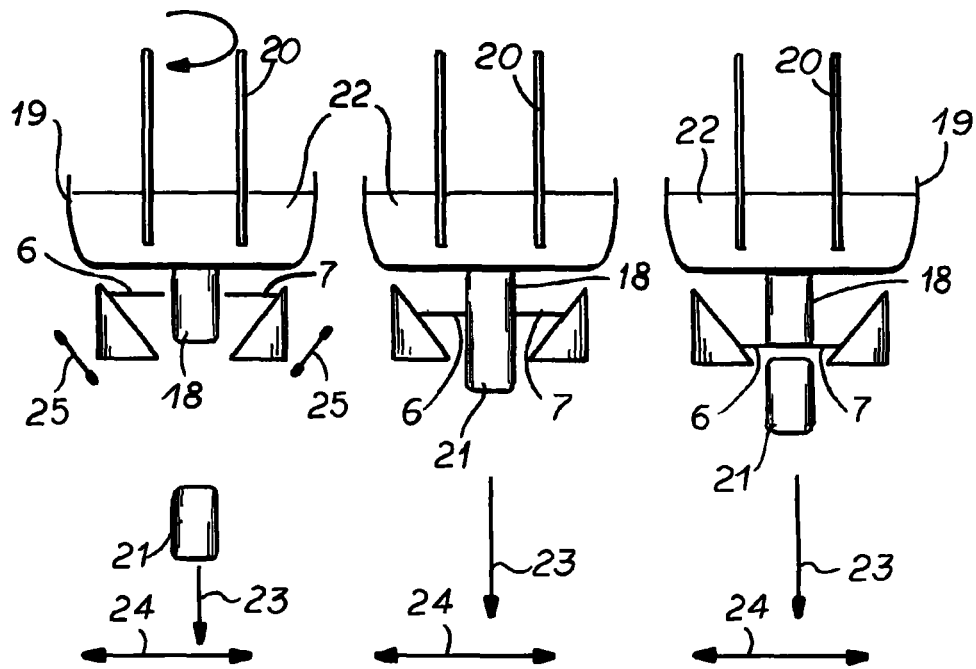
FIG. 1 is a largely schematic side view of a system according to the invention.

As seen in FIG. 1 a respective mass 22 of molten glass having a temperature of 1000° C., for example, is held in each of three supplies 19. The melt is fed to the supplies 19 via respective rotary tubes 20. The supplies 19 each have a discharge outlet at the bottom for the respective glass strand 18. Three pairs of cutting blades 6 and 7, here a lower blade 6 and an upper blade 7, are shown. A respective gob 21 is separated from the strand 18 issuing from the bottom of the supply 19 in direction Z here shown at 23. The blades 6 and 7 of each blade pair are movable horizontally relative to each other in direction x here shown at 24.

The cutting blades 6 and 7 of each cutting blade pair may be moved from an open position, shown on the left in FIG. 1, in which the glass strand 18 is able to pass downward between them without contacting them, via an intermediate position shown in the center of FIG. 1, into a closed position on the right of FIG. 1, in which the glass strand 18 is severed with formation of the gob 21. After the gob 21 is separated, the cutting blades 6 and 7 are moved back into the open position as shown on the left in of FIG. 1. The direction of movement of the cutting blades 6 and 7 in the direction 24 is at right angles to the direction 23.

According to the invention, the movement of the cutting blades 6 and 7 in the horizontal direction 24 is superimposed on movement in the vertical direction 23, as shown by the arrows 25. In this manner the cutting blades 6 and 7 move at least over the distance or time in which they are in contact with and sever the glass strand 18 for forming a gob 21, from an upper starting position according to the left side of FIG. 1, via an intermediate position according to the center of FIG. 1, into a lower end position according to the right side of FIG. 1, and then back into the upper starting position according to the left side of FIG. 1. Thus, without further auxiliary measures the flowing mass of the glass strand 18 is not compressed or deformed on the cutting blades 6 and 7, as in the situation according to the center and the right side of FIG. 5. The blades 6 and 7, in other words, move synchronously downward with the advancing strand 18 and follow the flow of the glass strand 18, at the same time cutting off the gob 21.

Figure 3:
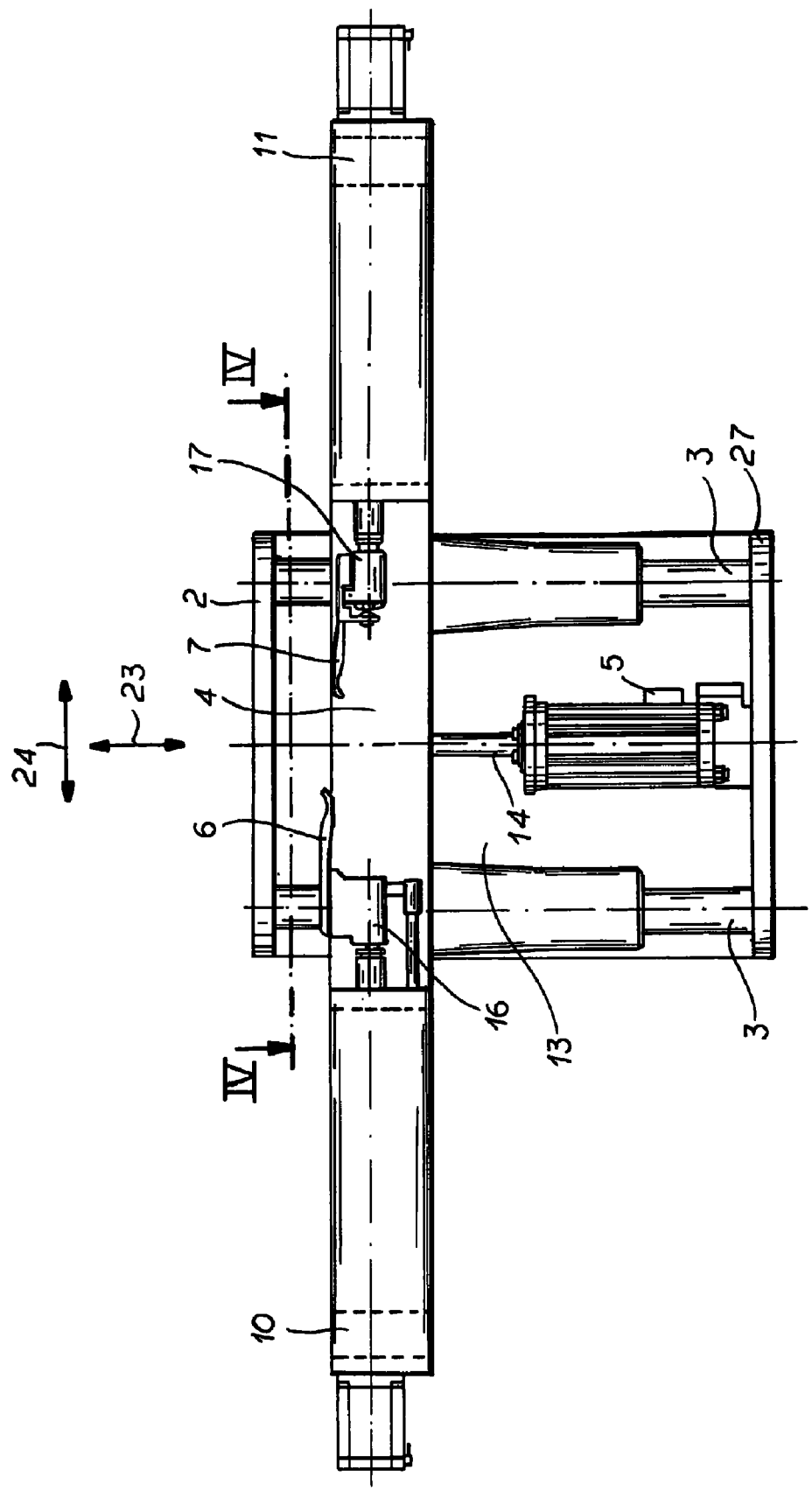
FIG. 3 is an end view of a part of the system according to the invention.
Figure 4:
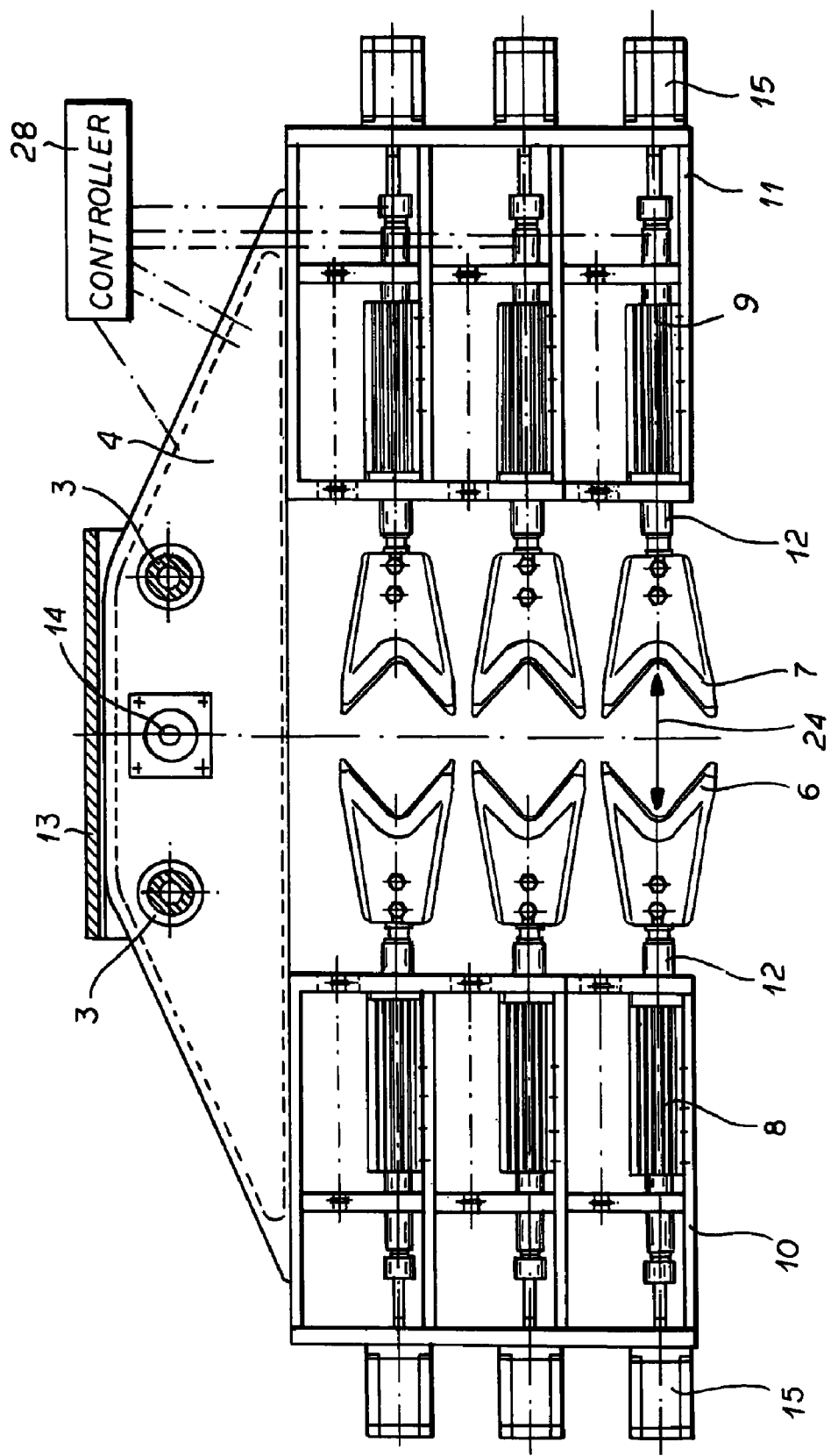
FIG. 4 is a section taken along line IV-IV of FIG. 3.

FIGS. 3 and 4 show a specific design of such a device. In this case, three upper cutting blades 6 and three lower cutting blades 7 are oppositely situated and correspondingly movable so that three glass strands 18 discharged from a supply 19 or multiple supplies may be severed for the separation of respective gobs 21. Here, each cutting blade 6 and 7 of a cutting blade pair is connected to a respective actuator 8 or 9 by means of which the cutting blades 6 may be moved in the horizontal direction 24 relative to the other cutting blades 7.

A second group actuator 5 is provided by means of which the actuators 8 and 9 together with the respective cutting blades 6 and 7 are movable in the vertical direction 23. By means of the actuators 8 and 9 and 5 the cutting blades 6 and 7 of each cutting blade pair may be moved in such a way that at the start of a separating cycle, i.e. analogous to the illustration on the left side of FIG. 1, the movement in the vertical direction 23, i.e. the start-up of the second actuator 5, occurs, so that the cutting blades 6 and 7 move synchronously in the same direction as the discharged glass strand 18. Only then does the movement of the cutting blades 6 and 7 in the horizontal direction 24 occur, and the cutting for separation of the gob 21 is performed. The cutting blades 6 and 7 are then moved back in the horizontal direction 24, opposite the cutting direction, into the open position as shown in FIG. 4 or on the left side of FIG. 1, and this movement is superimposed by a simultaneous movement in the vertical direction 23, which, however, during the return of the cutting blades 6 and 7 is in the direction opposite the downward discharge direction of the glass strand 18.

The first actuators 8 and 9 as well as the second actuator 5 are designed as linear actuators, here as pneumatic or hydraulic cylinders. As shown in particular in the illustration according to FIG. 4, the cutting blades 6 and 7 are provided with respective actuators 8 and 9 which are separately movable in the horizontal direction 24. This allows the cutting blades 6 and 7 to be individually actuated. The respective cutting blades 6 of each cutting blade pair together with the associated actuators 8 which are movable in the horizontal direction 24 are mounted and fastened on a first frame part 10. The cutting blades 7 of each cutting blade pair together with the associated actuators 9 which are movable in the horizontal direction 24 are mounted on a second frame part 11. Both the first and second frame parts 10, 11 are connected together by a lift plate 4 which may be moved in the vertical direction 23 by the second actuator 5 that is supported in a fixed manner on the frame. On the two outer end faces of the frame parts 10, 11 regulating devices 15 are provided for fine adjustment of the cutting blades 6 and 7 and the cutting edge pressure. A push or transmission rod 12 of each of the regulating devices 15 acts on a respective blade holding device 16 or 17 for adjustment of the cutting edge pressure of the respective blade 6 or 7. The push rod 12 for each actuator unit 8 or 9 is connected to the respective blade holder 16 or 17 and can be twisted where it projects to the rear from the respective actuator unit 8 or 9 to act on the setting for the parallelism of the cutting edges of the cutting blades 6 and 7.

A base plate 2 is connected via a flange 13 to a frame plate 27 located therebeneath. The frame plate 27 situated below forms the end support for the second actuator 5, which here is a single hydraulic or pneumatic cylinder having a piston rod 14 connected to the lift plate 4 that itself is vertically slidable on guide rods 3 extending between the plates 2 and 27 and forming therewith the machine frame. Thus, by means of the second actuator 5 the lift plate 4 may be moved upward toward the plate 2 or moved downward away from the plate 2 toward the plate 27.

Both individually controllable movement profiles in the horizontal and vertical directions afford the possibility of providing a synchronous cutting operation for the glass strand 18 flowing vertically downward. This means that each cutting blade 6 and 7 performs a defined temporal and spatial movement resulting from the X and Z axis speeds, directed obliquely downward and toward the center of the glass strand, i.e., the cutting center. This synchronization is made possible by a controller 28 connected to the cylinders 5, 8, and 9.

Figure 6:
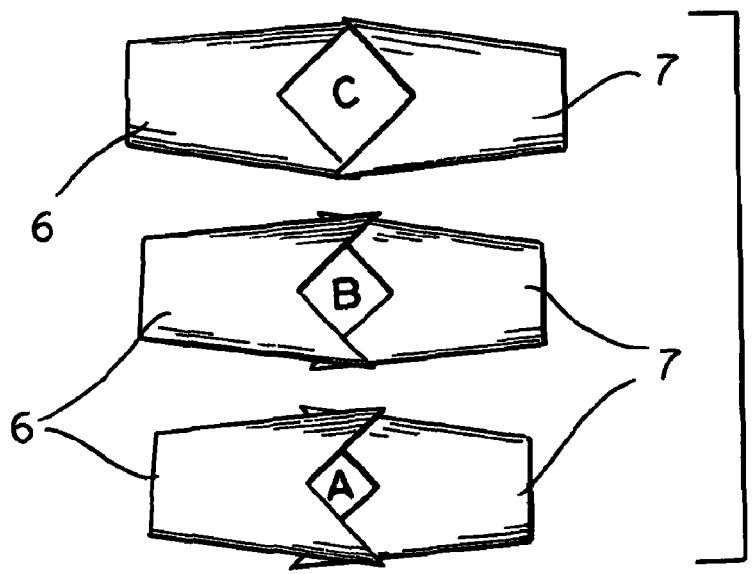
FIG. 6 is a schematic top view illustrating the method of the invention.

FIG. 6 shows the manner in which the sequence of the cutting is performed for isolating the gobs 21 from three glass strands 18 discharging from a supply. Unlike what is illustrated in FIG. 5, according to the invention the blades 6 and 7 are moved sequentially, so that the blades 6 and 7 cutting off the gob 21 that must travel along the longest path to the station A move inward first, then the blades 6 and 7 for the middle station B, and then the blades 6 and 7 for the closest station C. This way the gobs 21 will be cut off one after the other so that they all arrive at the same time at their respective preforms and will reside therein the same amount of time, getting the same amount of conditioning, typically heating, so that they will all be at the exact same temperature when subsequently finish molded or otherwise treated.

Figure 7:
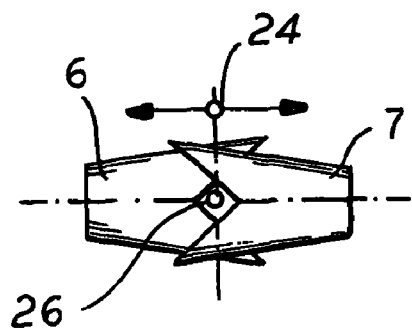
FIG. 7 is another top view illustrating an aspect of the inventive method.

FIG. 7 shows that the cutting center 26 may also be shifted by actuation of the cutting blades 6 and 7. Provided that both cutting blades 6 and 7 of a cutting blade pair are actuated at the same time, the cutting center 26 is situated at the axial center below the discharge opening from which the glass strand 18 emerges. If for certain reasons, for instance if the controller 28 detects that one of the strands 18 is shifting horizontally as it issues from its nozzle, the cutting center 26 is correspondingly shifted to the right or left. To this end either the right cutting blade 6 or the left cutting blade 7 may be actuated in advance with regard to the other respective blade, thereby shifting the cutting center 26 to the left or right.

The invention is not limited to the illustrated embodiment, but instead may be varied in a number of ways within the scope of the disclosure. All novel individual features and combinations of features disclosed in the description and/or the drawings are regarded as essential to the invention.

We claim:

1. In a method of making glass articles comprising the steps of:
   continuously emitting a plurality of strands of molten glass spaced different distances from respective preform molds;
   cutting through each of the strands by moving together a respective pair of blades to form a respective gob; and
   transporting the gobs through the respective distances to the preform molds,
   the improvement comprising the step of:
   operating the pairs of blades such that they cut through the respective strands one after the other with the first formed gob traveling through the longest distance to the respective preform mold and the last formed gob traveling through the shortest distance to the respective preform mold such that the gobs all are deposited into the respective preform molds at the same time.

2. The method defined in claim 1 wherein the pairs of blades all take the same amount of time to move from an open position to a closed position, the pairs being operated such that they are started one after the other.

3. The method defined in claim 2, further comprising the step of
   shifting the blades synchronously with the respective strands while moving them from the open position to the closed position.

4. The method defined in claim 3 wherein the pairs of blades are moved jointly parallel to the strands.

5. The method defined in claim 4 wherein the strands are emitted vertically downward, downward movement of the pairs of blades being started when the first pair of blades starts, the method further comprising the steps of
   moving each of the blades from the closed to the open position immediately when the respective gob is separated;
   continuing downward movement of all the blades until the last pair of blades has moved from the closed to the open position and thereafter upwardly shifting all the blades.

6. The method defined in claim 1 wherein the strands move downward continuously at a constant velocity.

7. A method of operating an apparatus for making glass articles, the apparatus comprising:
   a plurality of preform molds;
   means for continuously emitting a plurality of strands of molten glass spaced different distances from the respective preform molds;
   a pair of blades juxtaposed with each of the strands and each shiftable between an open position and a closed position;
   respective actuators connected to the pairs of blades, the method comprising the steps of:
   shifting the blades from their open to their closed positions and thereby cutting through the respective strands and sever respective gobs therefrom;
   transporting the gobs through the respective different distances to the preform molds; and
   sequentially operating the blades such that they cut through the respective strands one after the other with the first formed gob traveling through the longest distance to the respective preform mold and the last formed gob traveling through the shortest distance to the respective preform mold and such that the gobs all are deposited into the respective preform molds at the same time.

8. The method defined in claim 7 wherein the means for emitting emits the strands continuously downward at a constant velocity, the method further comprising the step of:
   shifting the blades vertically downward synchronously with the strands while the blades are moving from the open to the closed positions.

9. The defined in claim 8 wherein the respective blades are shifted from the closed position the open position when the respective gob is separated from the respective strand.

10. The method defined in claim 9, further comprising the step of
supporting all the blades on a common mount and thereby fixing the blades for common vertical movement, the actuator shifting the blades vertically downward being coupled to the common mount.

11. The method defined in claim 10 wherein the blades are shifted downward such that downward movement is started when the first pair of blades starts to close and is ended when the last pair of blades is shifted into the respective open position and then all the blades are shifted upward while in the open position.

* * * * *